(12) United States Patent
Reed et al.

(10) Patent No.: US 11,184,463 B1
(45) Date of Patent: Nov. 23, 2021

(54) INTERACTING WITH A CLIENT SYSTEM TO GATHER CLIENT DATA TO USE TO DIAGNOSE A PROBLEM AT THE CLIENT SYSTEM

(71) Applicant: INTERNATIONAL BUSINESS MACHINES CORPORATION, Armonk, NY (US)

(72) Inventors: David C. Reed, Tucson, AZ (US); Dianne Gamarra, Naples, FL (US); Ryan Arthur Bouchard, Tucson, AZ (US); Elliot Picker, New Hamburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/095,731

(22) Filed: Nov. 11, 2020

(51) Int. Cl.
| | |
|---|---|
| *G06F 15/16* | (2006.01) |
| *G06F 15/173* | (2006.01) |
| *H04L 29/06* | (2006.01) |
| *H04L 29/08* | (2006.01) |

(52) U.S. Cl.
CPC .............. *H04L 67/42* (2013.01); *H04L 67/02* (2013.01); *H04L 69/329* (2013.01)

(58) Field of Classification Search
USPC .............. 709/203, 250, 217, 208, 218, 219; 370/465, 466, 328; 705/2, 35
See application file for complete search history.

(56) References Cited

U.S. PATENT DOCUMENTS

| | | | |
|---|---|---|---|
| 7,254,607 B2 * | 8/2007 | Hubbard | G06F 11/3672 709/201 |
| 7,707,249 B2 | 4/2010 | Spataro et al. | |
| 7,792,920 B2 * | 9/2010 | Istvan | H04N 7/173 709/217 |
| 8,122,517 B2 | 2/2012 | Julin et al. | |
| 8,990,775 B2 | 3/2015 | Bates | |

(Continued)

FOREIGN PATENT DOCUMENTS

| | | |
|---|---|---|
| CN | 105978979 A | 9/2016 |
| EP | 3449414 A1 | 3/2019 |

(Continued)

OTHER PUBLICATIONS

English Translation for CN105978979, dated Sep. 28, 2016, pp. 8.

*Primary Examiner* — Jude Jean Gilles
(74) *Attorney, Agent, or Firm* — Konrad Raynes Davda & Victor LLP; David W. Victor

(57) ABSTRACT

Provided are a computer program product, system, and method for providing diagnostic services to a client system over a network. A program is transmitted to a client program at the client system including a command to retrieve a block of data. The client program is executed to retrieve the block of data indicated in the command and display data in the block of data in a client user interface at the client system. The client program transmits the data displayed in the client user interface to the diagnostic system in response to user indication to transmit the data displayed in the client user interface. The data received from the client program is rendered in the client user interface. The received data is processed to determine a next operation in a diagnostic workflow program with respect to the client system.

20 Claims, 13 Drawing Sheets

(56) References Cited

U.S. PATENT DOCUMENTS

| | | | |
|---|---|---|---|
| 9,015,281 B2 | 4/2015 | Moffat | |
| 10,503,576 B2 | 12/2019 | Bailey et al. | |
| 10,671,758 B2 | 6/2020 | Joisha | |
| 2011/0307233 A1* | 12/2011 | Tseng | G06F 30/331 703/14 |
| 2013/0318347 A1 | 11/2013 | Moffat | |
| 2014/0244721 A1* | 8/2014 | Taine | H04L 67/1095 709/203 |
| 2015/0128283 A1* | 5/2015 | Mashima | G06F 21/60 726/26 |
| 2016/0302666 A1* | 10/2016 | Shaya | H04L 65/403 |
| 2017/0000463 A1* | 1/2017 | Fujii | A61B 8/5269 |
| 2017/0243019 A1 | 8/2017 | Bailey et al. | |
| 2017/0286199 A1* | 10/2017 | Soini | G06F 9/44 |
| 2018/0367472 A1* | 12/2018 | Huang | H04L 63/04 |
| 2019/0227908 A1 | 7/2019 | Munafo et al. | |
| 2019/0332807 A1 | 10/2019 | Lafever et al. | |

FOREIGN PATENT DOCUMENTS

| | | |
|---|---|---|
| WO | 2003007151 | 1/2003 |
| WO | 2017187207 A1 | 11/2017 |

\* cited by examiner

```
Remote Diagnosis Dump Viewer - Client

Session started Tuesday 11/19/2019 at 10:00:00
Reviewing dump: 'SYSA.DUMP.D111819.T092300'

[ Verification Mode ]        [ Automatic Mode ]

VERIFICATION MODE

Jane - Tech (10:05.26 am): Submitted request for data.

061CE400   D6E4C3C2  01D81298  0624C400  F9C52178    OUCB.Q.q..D.9E..
061CE410   00002048  83000000  0001EAFF  01010001    ................c..
061CE420   001E0000  00040000  00000000  00F65D00    ..............6)
061CE430   00000000  F9C52178  00000000  00000000    ....9E..........
061CE440   0000002C  00000000  F9C52178  000003E6    ............9E...9E.
061CE450   000003E6  00000006  00000000  00000000    .9E.............W
061CE460   00000000  00000000  00210467  000002B9    ................
061CE470   00000000  00000000  0000FF00  000004A1    ................~
061CE480   F9C51CD7  00000000  00000000  00000000    9E.P............9E.P..
061CE490   F9C52178  00000000  00000000  00000000    9E..............9E.
061CE4A0   E3E2D640  00000000  00000000  40404040    TSO @...........TSO
061CE4B0   00000000  00000000  C5E74040  40404040    ........EX @@   .EX
061CE4C0   C7C1D4C1  D9D9C140  06EC4170  00000000    GAMARRA ..Ap....GAMARRA

[ Approve ]          ( Reject )         [ Redact ]
                          404

Joe Smith - Client Tech (10:05.27 am): Do Not Send
```

FIG. 4A

```
┌─────────────────────────────────────────────────────────────┐
│  Remote Diagnosis Dump Viewer - Diagnostic System           │── 410
├─────────────────────────────────────────────────────────────┤
│  Session started Tuesday 11/19/2019 at 10:00:00             │
│  Reviewing dump: 'SYSA.DUMP.D111819.T092300'                │
├─────────────────────────────────────────────────────────────┤
│                     VERIFICATION MODE                        │
├─────────────────────────────────────────────────────────────┤
│  Jane - Tech       (10:05.26 am): IRAOUCB 61CE400           │
├─────────────────────────────────────────────────────────────┤
│  Joe Smith - Client Tech (10:05.27 am): REJECT              │
└─────────────────────────────────────────────────────────────┘
```

FIG. 4B

```
┌─────────────────────────────────────────────────────────────────────┐
│                  Remote Diagnosis Dump Viewer - Client              │── 500
├─────────────────────────────────────────────────────────────────────┤
│ Session started Tuesday 11/19/2019 at 10:00:00                      │
│ Reviewing dump: 'SYSA.DUMP.D111819.T092300'                         │
│                                                                     │
│    ┌──────────────────────┐          ┌──────────────────────┐       │
│    │  Verification Mode   │          │    Automatic Mode    │       │
│    └──────────────────────┘          └──────────────────────┘       │
├─────────────────────────────────────────────────────────────────────┤
│                         VERIFICATION MODE                           │
│ Jane - Tech (10:05.26 am) : Submitted request for data.             │
│  ─────────────────────────────────────────────────────────── ── 502 │
│ 061CE400  D6E4C3C2  01D81298  0624C400  F9C52178  OUCB.Q.q..D.9E..  │
│ 061CE410  00002048  83000000  0001EAFF  01010001  ............      │
│ 061CE420  001E0000  00040000  00000000  00F65D00  ............6)..  │
│ 061CE430  00000000  F9C52178  00000000  00000000  ....9E..........  │
│ 061CE440  00000000  00000000  F9C52178  F9C52178  ........9E..9E..  │
│ 061CE450  0000002C  00000006  00000000  000003E6  ...............W  │
│ 061CE460  000003E6  00000000  00000000  00000000  ...W............  │
│ 061CE470  00000000  00000000  002104A1  000002B9  ..............~.  │
│ 061CE480  00000000  00000000  0000FF00  000004A1  ...............   │
│ 061CE490  F9C51CD7  00000000  00000000  00000000  9E.P............  │
│ 061CE4A0  F9C52178  00000000  00000000  00000000  9E..............  │
│ 061CE4B0  E3E2D640  00000000  00000000  40404040  TSO        .EX    │
│ 061CE4C0  00000000  00000000  C5E74040  40404040                    │
│ 061CE4D0 ┌─────────┐00000000  40404040  40404040  ............      │
│ 061CE4E0 │RRRRRRRR │00000000  06EC4170  00000000  ............      │
│          └─────────┘                                                │
│               │504              │506                                │
│  ┌──────────┐           ┌──────────┐           ┌──────────┐         │
│  │ Approve  │           │  Reject  │           │  Redact  │── 508   │
│  └──────────┘           └──────────┘           └──────────┘         │
├─────────────────────────────────────────────────────────────────────┤
│ Joe Smith - Client Tech (10:10.12 am) : Redact                      │
└─────────────────────────────────────────────────────────────────────┘

FIG. 5A
```

```
Remote Diagnosis Dump Viewer - Diagnostic System
```
— 510

Session started Tuesday 11/19/2019 at 10:00:00
Reviewing dump: 'SYSA.DUMP.D111819.T092300'

VERIFICATION MODE

Jane - Tech (10:05.26 am) : IRAOUCB 61CE400

Joe Smith - Client Tech (10:10.12 am) : REDACT — 512

```
OUCB at 061CE400 ASID(X'0115')          HBB77B0 Generated 05/09/19 04:58:38
lblk.....+000                    +000                   name........+000 OUCB
fwd......+004 01D81298 chel......+008 0661A400 tma.........+004 F9CAD9B5
qfl......+010 00       bck.......+010 off      gol.........+010 off
gob......+010 off      goo.......+010 off      off.........+010 off
out......+010 off      qsfl......+010 off      dlyb........+010 off
sfl......+011 00       lsx.......+011 off      cti.........+011 off
bib......+011 off      nsx.......+011 off      nswi........+011 off
pvl......+011 off      inv.......+011 off      scn.........+011 off
yfl......+012 20       eng.......+012 off      stt.........+012 off
log......+012 On       pste......+012 off      rsfl........+012 off
axs......+012 off      mnt.......+012 off      fxs.........+012 off
afl......+013 48       dta.......+013 off      apg.........+013 On
rep......+013 off      irsw......+013 off      jsr.........+013 On
mxs......+013 off      enqi......+013 off      asv.........+013 off
tfl......+014 83       nwt.......+014 On       str.........+014 off
ntr......+014 off      atr.......+014 off      pch.........+014 off
mar......+014 off      rtr.......+014 On       inc.........+014 On
efl......+015 00       inp.......+015 off      qsflp2......+015 off
qsc......+015 off      lwt.......+015 off      rsv3........+015 00
ufl......+017 00       mxt.......+017 off      jsas........+017 off
nsxdp....+017 off      jsfs......+017 off      tsve........+017 off
si.......+017 off      tsvp......+017 off      sifx........+017 off
                       engr......
```

FIG. 5B

```
Remote Diagnosis Dump Viewer - Client                                          600

Session started Tuesday 11/19/2019 at 10:00:00
Reviewing dump: 'SYSA.DUMP.D111819.T092300'

[ Verification Mode ]                    [ Automatic Mode ]

AUTOMATIC MODE
Jane - Tech (10:03.35 am) : Submitted request for data.                        602

Data:
00E67580   C1E2C3C2 00FC3100 00E67D00 00000000  | ASCB........W'......
00E67590   .:E6759F. LENGTH(X'10')--All bytes contain X'00'
00E675A0   00000002 01E50100 000100EA 00000000  | .....v..............
00E675B0   7FF17E00 00000000 1C769600 00B3B628  | "1=......o......
00E675C0   00000002 207EBD18 D70B01AA 10C05D83  | .....=..P....()c Joe Smith - Client Tech (10:03.55 am) : Data automatically sent
Jane - Tech (10:05.25 am) : Submitted request for data.

061CE400   D6E4C3C2 01D81298 0624C400 F9C52178  | OUCB.Q.q..D.9E......     604
061CE410   00002048 83000000 0001EAFF 01010001
061CE420   001E0000 00040000 00000000 00F65D00  | .........c......6)..
061CE430   00000000 F9C52178 00000000 00000000  | ........9E..........
061CE440   00000000 00000000 F9C52178 F9C52178  | ........9E..9E..
061CE450   00000000 00000000 00000006 000003E6  | ...............W
061CE460   00000000 00000000 00000000 00000000
061CE470   00000000 00000000 00210467 000002B9
061CE480   00000000 00000000 0000FF00 000004A1  | ................~
061CE490   F9C51CD7 00000000 00000000 00000000  | 9E.P................
061CE4A0   F9C52178 00000000 00000000 00000000  | 9E..................
061CE4B0   E3E2D640 00000000 C5E74040 40404040  | TSO    ..EX
061CE4C0   00000000 00000000 00000000 40404040
061CE4D0   C7C1D4C1 D9D9C140 40404040 40404040  | GAMARRA
061CE4E0   00000000 00000000 06EC4170 00000000

Joe Smith - Client Tech (10:05.27 am) : Data automatically sent
```

FIG. 6A

```
┌─────────────────────────────────────────────────────────────────────────────┐
│                  Remote Diagnosis Dump Viewer - Diagnostic System           │──610
│                                                                             │
│ Session started Tuesday 11/19/2019 at 10:00:00                              │
│ Reviewing dump: 'SYSA.DUMP.D111819.T092300'                                 │
│                          AUTOMATIC MODE                                     │
│                                                                             │
│ Jane - Tech (10:03.35 am): cbf ascb230 view(keyfields)                      │
│                                                                             │──612
│ Joe Smith - Client Tech (10:03.55 am): Data automatically sent              │
│                                                                             │
│ ASCB: 00E64B80                                                              │
│  +0004 FNDP.....  00E5C880  ASID......  00E6   CSCB......  1C778800         │
│        TSB......  00B01820  AFFN......  FFFF   ASXB......  008FD000         │
│  +0072 DSP1.....  10        FLG2......  00     SRBS......  0000             │
│        LOCK.....  00000000  ASSB......  0SE41000                            │
│  Address space non-dispatchability flags from ASCBDSP1:                     │
│  STATUS stop SRB summary                                                    │
│                                                                             │
│ Jane - Tech (10:05.26 am): IRAOUCB 61CE400                                  │
│                                                                             │
│ Joe Smith - Client Tech (10:05.27 am): Data automatically sent              │
│                                                                             │──614
│ OUCB at 061CE400 ASID(X'0115')        HBB77B0 Generated 05/09/19 04:58:38   │
│ lblk...  +000                         +000 OUCB                             │
│ fwd....  +004 01D81298                +004 F9CAD9B5                         │
│ qfl....  +010 00         chel.....    +008 0661A400     tma......           │
│ gob....  +010 Off        bck......    +010 Off          gol......           │
│ out....  +010 Off        goo......    +010 Off          off......           │
│ sfl....  +010 Off        qsfl.....    +010 Off          dlyb.....           │
│ bib....  +011 00         lsx......    +011 Off          ctl......           │
│ pvl....  +011 Off        nsx......    +011 Off          nswi.....           │
│ yfl....  +011 Off        inv......    +011 Off          scn......           │
│ log....  +012 20         eng......    +012 Off          stt......           │
│ axs....  +012 On         pste.....    +012 Off          rsfl.....           │
│ afl....  +013 48         mnt......    +012 Off          fxs......           │
│ rep....  +013 Off        dta......    +013 Off          apg......           │
│ mxs....  +013 Off        irsw.....    +013 On           jsr......           │
│ tfl....  +014 83         enqi.....    +013 On           asv......           │
│ ntr....  +014 Off        nwt......    +013 Off          str......           │
│ mar....  +014 Off        atr......    +014 Off          pch......           │
│ efl....  +014 Off        rtr......    +014 On           inc......           │
│ qsc....  +015 00         inp......    +014 On           qsflp2...           │
│ ufl....  +015 Off        lwt......    +015 Off          rsv3.....           │
│ nsxdp..  +017 00         mxt......    +015 00           jsas.....           │
│ si.....  +017 Off        jsfs.....    +017 Off          tsve.....           │
│                          tsvp.....    +017 Off          sifx.....           │
│                          engr.....    +017 Off                              │
└─────────────────────────────────────────────────────────────────────────────┘
```

FIG. 6B

INTERACTING WITH A CLIENT SYSTEM TO GATHER CLIENT DATA TO USE TO DIAGNOSE A PROBLEM AT THE CLIENT SYSTEM

BACKGROUND OF THE INVENTION

1. Field of the Invention

The present invention relates to a computer program product, system, and method for interacting with a client system to gather client data to use to diagnose a problem at the client system.

2. Description of the Related Art

To troubleshoot a customer computer system, customers may send computer data and files to a remote diagnostic service over the network by uploading the data and sending via File Transfer Protocol (FTP) or email for analysis by the diagnostic service. The diagnostic software tools to analyze the customer data may not be available or run on the customer computer. In certain situations, customers may decline to transmit information to the remote site out of concerns over loss of control of their data. In addition, some countries have laws that do not allow certain data to be transmitted outside of the country.

There is a need in the art for improved techniques for remote diagnosis of computer systems over the Internet or other networks.

SUMMARY

Provided are a computer program product, system, and method for providing diagnostic services to a client system over a network. A program is transmitted to a client program at the client system including a command to retrieve a block of data. The client program is executed to retrieve the block of data indicated in the command and display data in the block of data in a client user interface at the client system. The client program transmits the data displayed in the client user interface to the diagnostic system in response to user indication to transmit the data displayed in the client user interface. The data received from the client program is rendered in the client user interface. The received data is processed to determine a next operation in a diagnostic workflow program with respect to the client system.

BRIEF DESCRIPTION OF THE DRAWINGS

FIGS. 2*a*, 3*a*, 4*a*, 5*a*, and 6*a* illustrate examples of the display of data at a client system before transmitting to a remote diagnostic system for diagnosis.

FIGS. 2*b*, 3*b*, 4*b*, 5*b*, and 6*b* illustrate examples of how data from a client system is rendered at the remote diagnostic system for diagnosis of the client system.

DETAILED DESCRIPTION

A user at a client system may be hesitant to automatically transmit data to a remote diagnostic system for diagnosis of problems at the client system due to concerns over sending confidential and personal information and concerns about legal restrictions on transmitting data. Described embodiments provide improvements to computer technology for transmitting client data, such as contents of memory dumps, to a remote diagnostic system that provides the client control over the data transmitted. With the described embodiments, the data, such as a memory dump of blocks of data in a memory of the client system that are requested by the diagnostic system, is displayed to provide the user of the client system the opportunity to review the collected data and approve transmittal to the diagnostic system, reject sending the data or allow the user at the client system to redact certain of the gathered data to transmit redacted data to the diagnostic system to process.

In further embodiments, the diagnostic system may process received data from the client system and determine further data that is needed, and allow the client system to again review the further requested data before transmitting the data to the diagnostic system. In this way, the client is incentivized to interact with the diagnostic system to participate in remote computer diagnosis because the client can be assured the data they are sending does not disclose important confidential, sensitive and personal information that is not appropriate to transmit outside of the client system to a third party.

Figure 1:
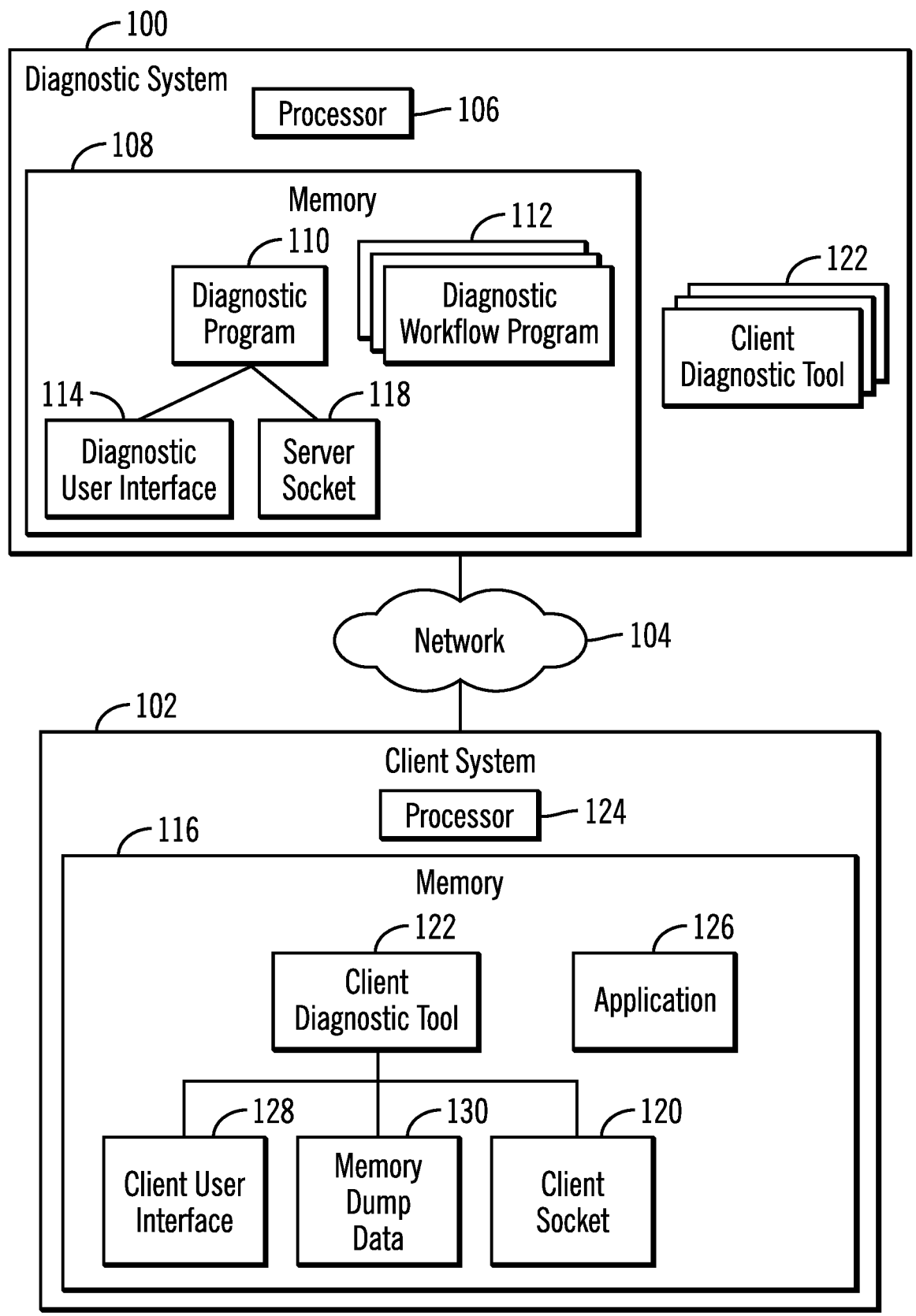
FIG. 1 illustrates an embodiment of a diagnostic computing environment.

FIG. 1 illustrates an embodiment of a diagnostic system 100 that troubleshoots technical problems in a client system 102 over a network 104. Although one client system 102 is shown, there may be multiple client systems 102 that interact with the diagnostic system 100 to diagnose and troubleshoot technical problems in the plurality of client systems 102, including software and/or hardware problems. The diagnostic system includes a processor 106 comprising one or more processor cores that execute programs loaded in a memory 108, including a diagnostic program 110 to manage diagnostic operations, and one or more diagnostic workflow programs 112. The diagnostic program 110 may generate a diagnostic user interface 114 to display requested data returned by the client system 102 for diagnostic purposes, including data from a memory dump 130 of data blocks in a memory 116 at the client system 102 and other client data.

The diagnostic program 110 may instantiate a server socket 118 to maintain communication with a client socket 120 in one client system 102 over the network. The diagnostic system 100 further maintains client diagnostic tools 122 to distribute to client systems 102 requesting diagnostic services. There may be different client diagnostic tools 122 to distribute to client systems 102 for different types of problems and applications to diagnose and troubleshoot.

A diagnostic workflow program 112 includes program logic implementing a diagnostic workflow comprising conditional branches of program code having conditional paths to traverse according to requested data received from the client system 102. Different branches of the diagnostic workflow may request different data from the client system 102, such as different blocks of data from a client system memory 116 in a memory dump 130. This requested data returned to the diagnostic system 100 is used by the diagnostic workflow program 112 to determine further conditional branches to traverse until a solution or other state is reached in the diagnostic workflow. There may be different diagnostic workflow programs 112 for different types of technical and application 126 problems to diagnose.

The client system 102 includes a processor 124 comprising one or more processor cores that execute programs loaded in the client memory 116, including a client diagnostic tool 122, which may be distributed by the diagnostic system 100, and one or more application programs 126, which may be the subject of the troubleshooting and diagnostic operations. The client diagnostic tool 122 may generate a client user interface 128 to display data accessed from the client system 102 used for diagnostic purposes, including data from a memory dump 130 of the memory 116 and/or other client data. Described embodiments discuss the client retrieving memory dump data 130. In further embodiments, other data may be gathered at the client system 102 from locations other than a memory 116 dump, such as specific requested information gathered using an application program interface (API). The diagnostic program 110 may further instantiate a client socket 120 to maintain communication with the server socket 118 to facilitate communication with the diagnostic system 100 over the network 104.

The network 104 may comprise a network such as a Storage Area Network (SAN), Local Area Network (LAN), Intranet, the Internet, Wide Area Network (WAN), peer-to-peer network, wireless network, arbitrated loop network, etc.

The memories 108, 116 may comprise a suitable volatile or non-volatile memory for storing programs to execute and information used by the programs to execute.

The programs 110, 112, 114, 118, 120, 122, 126, 128 may comprise program code loaded into memory and executed by a processor. Alternatively, some or all of the functions may be implemented in hardware devices, such as in Application Specific Integrated Circuits (ASICs) or executed by separate dedicated processors.

Although a certain number of instances of elements, such as the diagnostic system 100 and client system 102 are shown, there may be any number of these elements.

FIGS. 2a, 3a, 4a, 5a, and 6a illustrate an embodiment of pages rendered in the client user interface 128 during operation of the client diagnostic tool 122. FIGS. 2b, 3b, 4b, 5b, and 6b, illustrate an embodiment of pages rendered in the diagnostic user interface 114 during operation of the diagnostic program 110 at the diagnostic system 100.

Figure 2A:
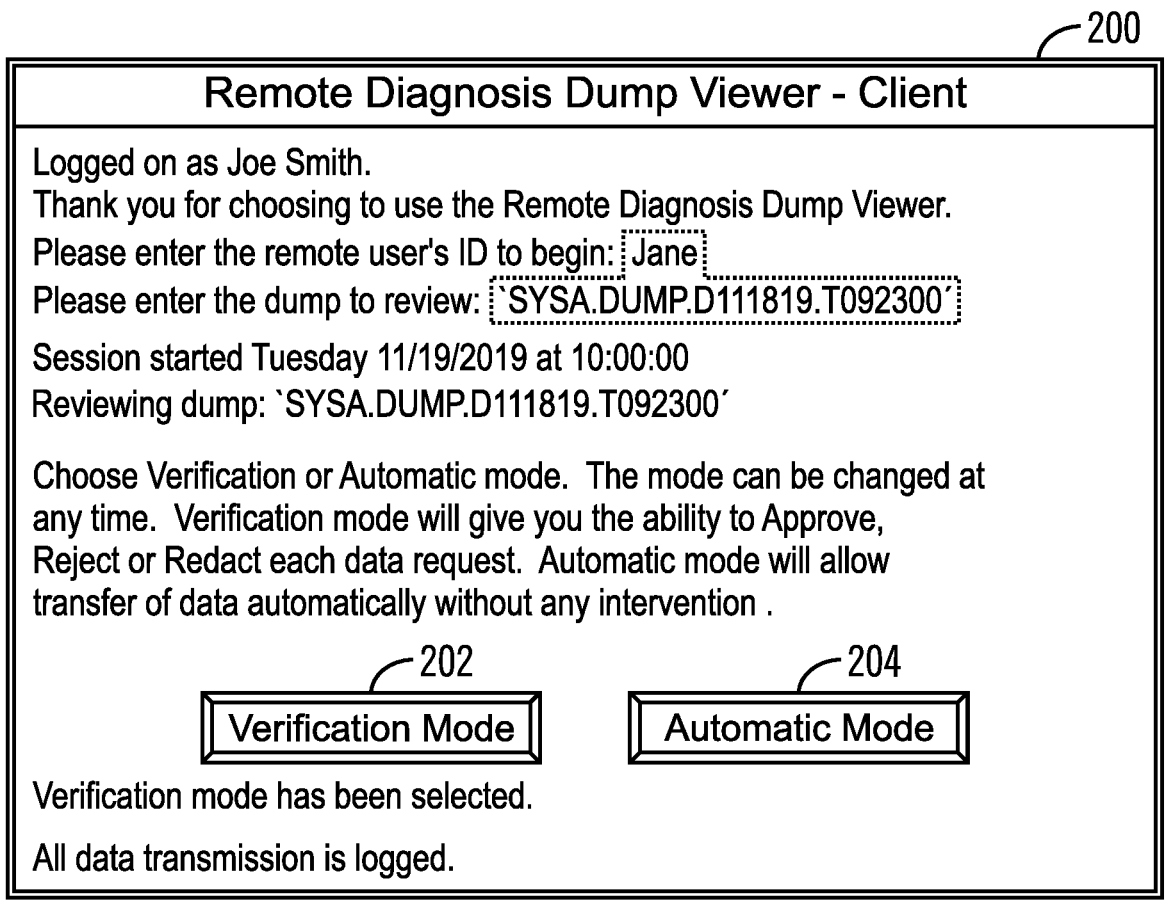

FIG. 2a provides a page 200 rendered in the client user interface 128 when a user at the client system 102 first invokes the client diagnostic tool 122 to start the diagnosis process. The client user may select in the page 200 a verification mode control 202 to indicate to allow the user to review data gathered from the client system 102 before sending to the diagnostic system 100 or an automatic mode control 204 to automatically transfer data gathered from the client system 102 at the request of the diagnostic program 110 without user review.

Figure 2B:
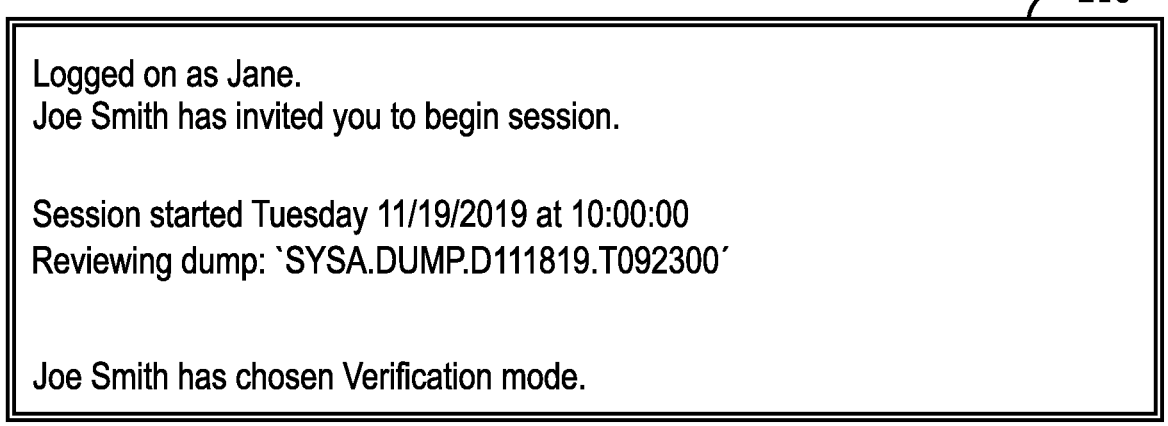

FIG. 2b provides an example of a page 210 rendered at the diagnostic user interface 114 at the diagnostic system 100 in response to the client 102 user initiating the diagnostic session through page 200 to provide information on the user initiating a diagnostic session at the client system 102 and the selected data review mode, verification or automatic.

Figure 3A:
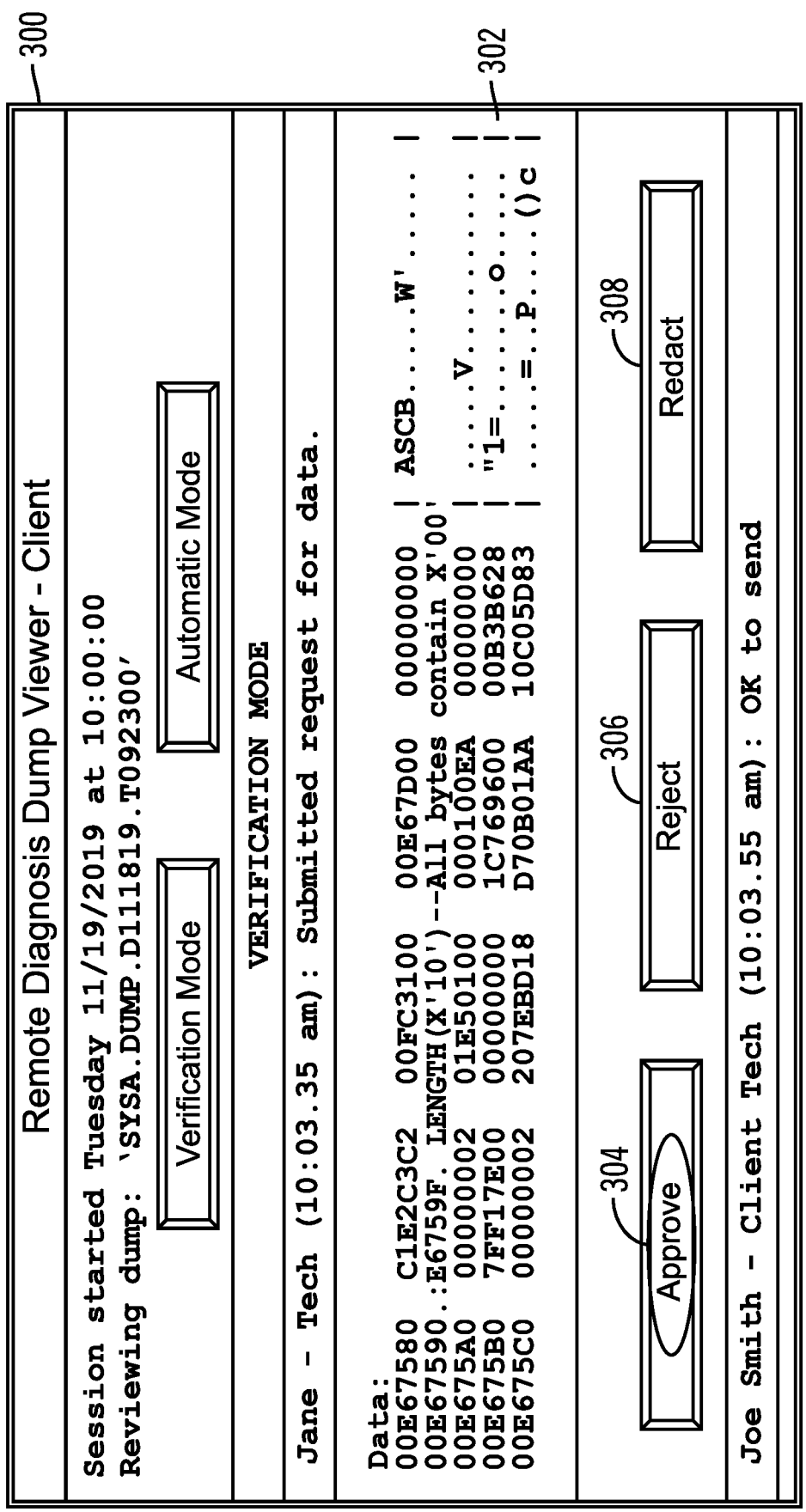

FIG. 3a provides an example of a page 300 rendered at the client user interface 128 to show data 302 from a memory dump 130 at an address range in the memory 116 requested by the diagnostic program 110. The page 300 displays an approve button 304, or graphical control element, that when selected transmits the data 302 to the diagnostic system 100 without any changes; a rejection button 306 that when selected causes the return of a message to the diagnostic system 100 that the user at the client system 102 declined to transmit any of the requested data; and a redact button 308 that when selected allows the user at the client system 102 to select data 302 in the page 300 to redact or remove, such as if the data is confidential, personal or sensitive information in a human readable form or extended binary-coded decimal interchange code (EBCDIC) the user is not comfortable sharing.

Figure 3B:
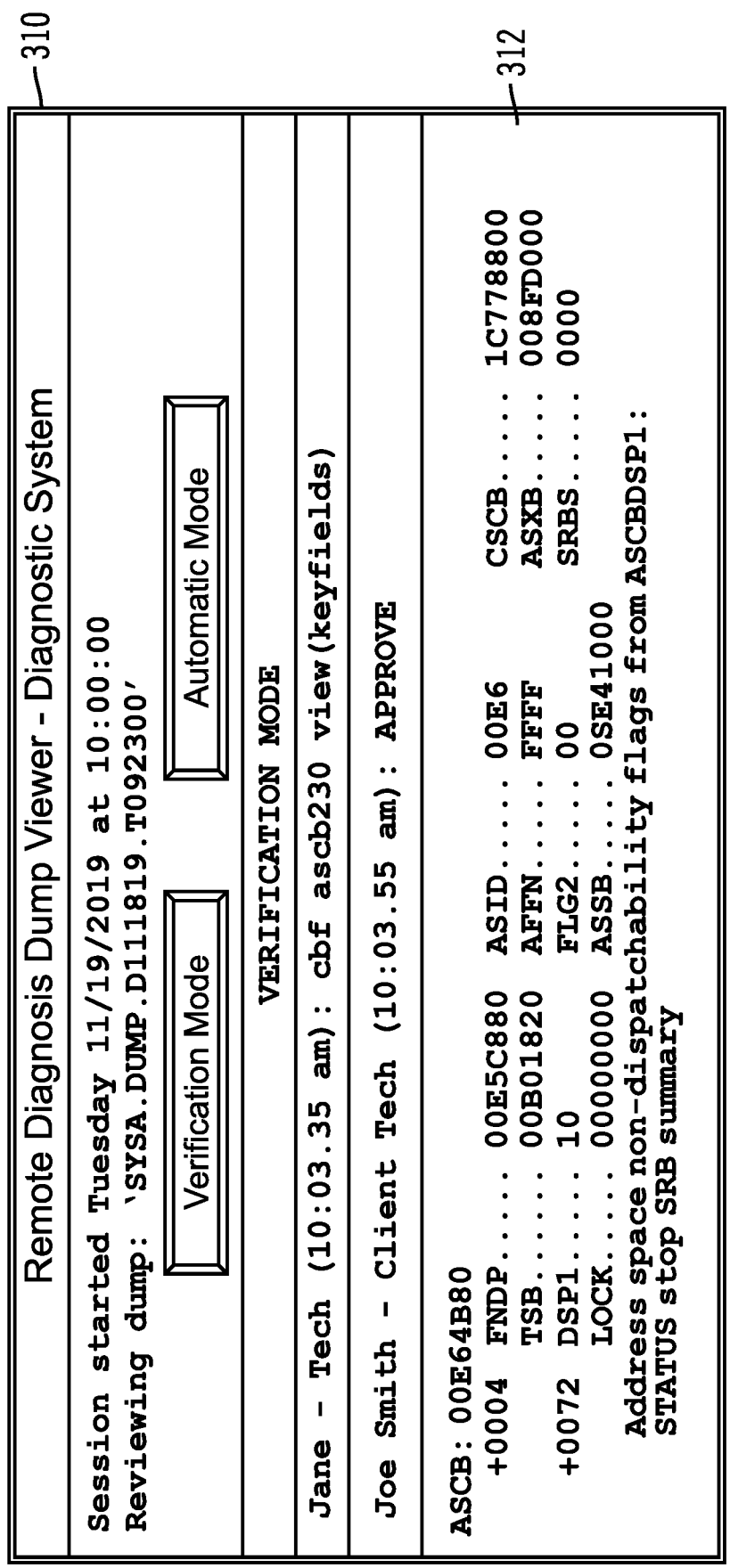

FIG. 3b illustrates an example of a page 310 the diagnostic user interface 114 displays to show the data 302 formatted as data 312 when the user selected the approve button 304 to send all the data 302 unredacted to the diagnostic system 100.

FIG. 4a provides a page 400 rendered at the client user interface 128 to show data 402 from a memory dump 130 at an address range in the memory 116 requested by the diagnostic program 110. In the client user interface 128, the user has selected the reject button 404 to decline to send any of the gathered data 402 to the diagnostic system 100.

FIG. 4b illustrates an example of a page 410 the diagnostic user interface 114 displays to notify the user of the diagnostic system 100 that the user selected reject 404 to not send any of the requested data.

FIG. 5a provides an example of a page 500 rendered at the client user interface 128 to show data 502 from a memory dump 130 at an address range in the memory 116 requested by the diagnostic program 110. In the page 500 rendered at the client user interface 128, the user has highlighted certain data fields 504, 506 to redact and selected the redact button 508 to redact the selected data fields 504, 506 from the data to send to the diagnostic system 100.

FIG. 5b illustrates an example of a page 510 the diagnostic user interface 114 displays to display the redacted data 512 from the client system 102.

FIG. 6a provides an example of a page 600 rendered at the client user interface 128 to show data 602, 604 from two different memory dumps that are automatically sent to the diagnostic system 100 in automatic mode without client user review.

FIG. 6b illustrates an example of a page 610 the diagnostic user interface 114 displays having panels 612, 614 of the client sent data 602, 604, respectively, automatically sent from the client system 102.

Figure 7:
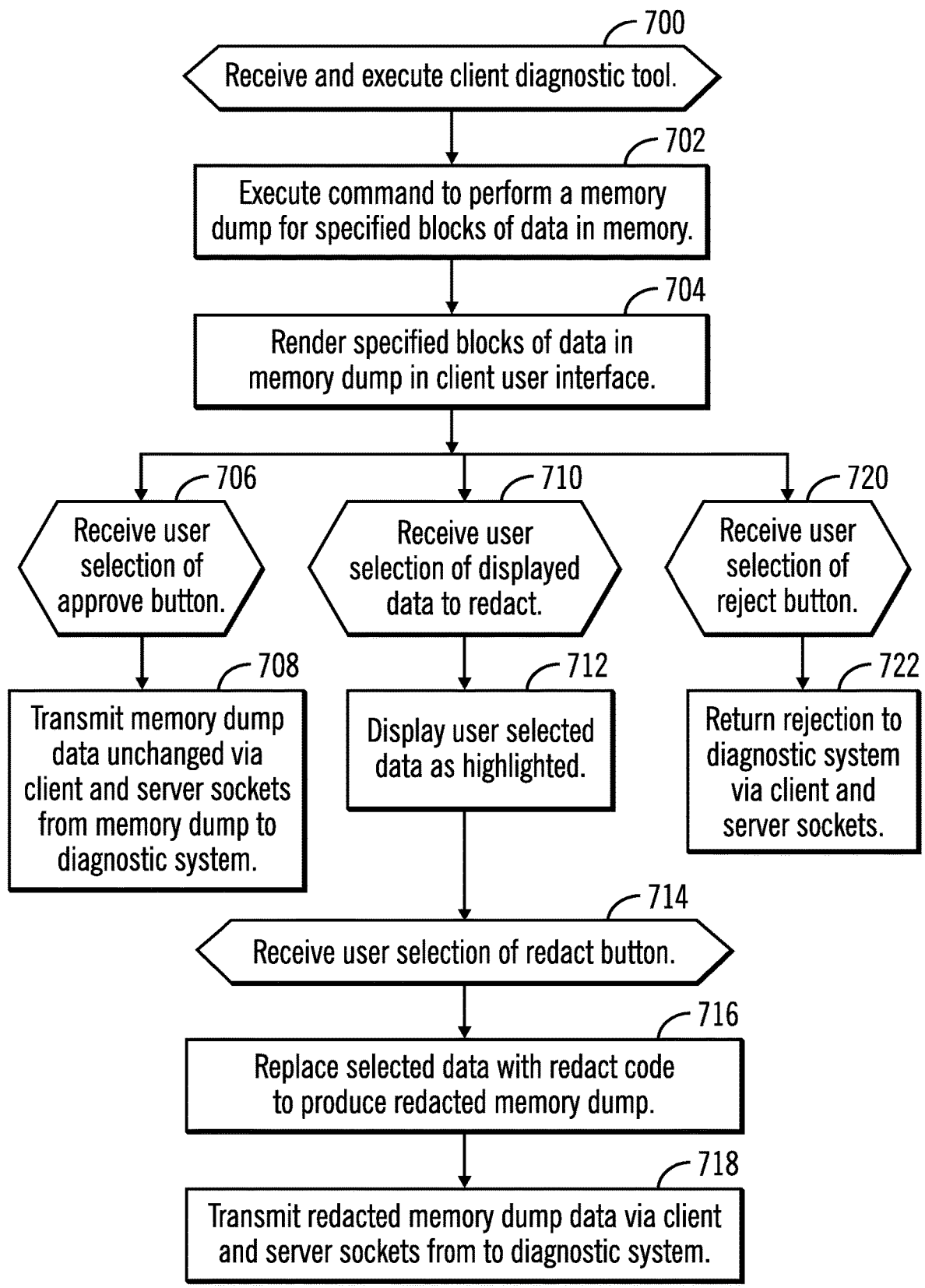
FIG. 7 illustrates an embodiment of operations performed at the client system to gather data to send to a remote diagnostic system to diagnosis problems at the client system.

FIG. 7 illustrates an embodiment of operations performed by the client diagnostic tool 122, which is initially invoked on the client system 102 to troubleshoot a problem with applications 126 and/or hardware at the client system 102. The operations of FIG. 7 may be invoked when the client system 102 downloads and executes the client diagnostic tool 122 to initiate a diagnostic session. Upon receiving and executing (at block 700) the client diagnostic tool 122, the client diagnostic tool 122 executes (at block 702) a command to perform a memory dump for specified blocks of data in memory 116 to copy the specified blocks of memory 116 to the memory dump data 130. The specified blocks may be encoded in the tool 122 for the first memory dump to perform to start the diagnostic process. The memory dump may be performed by an Inter Process Communication System (IPCS) command in batch mode to dump the specified blocks of memory 116 to a user dump directory 130. The data in the memory dump 130 is rendered (at block 704) in the client user interface 128, such as the display of data 302, 402, 502, 602, 606 in the client user interface 128 shown in FIGS. 3a, 4a, 5a, 6a.

Upon receiving (at block 706) user selection of the approve button 304 (FIG. 3*a*), the client diagnostic tool 122 transmits (at block 708) the memory dump data 130 unchanged via the client 120 and server 118 sockets to the diagnostic system 100.

Upon receiving (at block 710) user selection of data 504, 506 in the display data 502 (FIG. 5*a*) to redact, the client diagnostic tool 122 displays (at block 712) the user selected data 504, 506 as highlighted. Upon receiving (at block 714) user selection of the redact button 508, the selected data 504, 506 is replaced (at block 716) with a redact code, such as a character, e.g., "R". The redacted memory dump 130 data is transmitted (at block 718) via the client 120 and server 118 sockets to the diagnostic system 100. In one embodiment, the problem being troubleshooted is a problem with a database at the client system 102, then the gathered memory dump 130 may include a database index with client data. In such case, the user may redact the client data and return to the diagnostic system 100 the index structure for the diagnostic workflow program 112 to diagnose and repair.

Upon receiving (at block 720) user selection of the reject button 404 (FIG. 4*a*), the client diagnostic tool 122 returns (at block 722) a rejection message to the diagnostic system 100 via the client 120 and server 118 sockets without any of the displayed memory dump data 402.

With the embodiment of operations of FIG. 7, the client is allowed to review data before returning the requested data to the diagnostic system 100 to allow the user to reject all the data to send or to redact sensitive or personal information the client user notices in the displayed data. This allows the client to control the data sent to the diagnostic system. In most cases, the data rendered from the memory dump 130 will include counters, pointers and other program control data that is incomprehensible to the user and will likely be approved by the user to send. However, there may be EBCDIC data the client is not comfortable sharing. In such case, the client can redact the data to prevent it from being shared with the diagnostic system 100. This option to redact or reject sending data will encourage the client to have their system diagnosed through the diagnostic tool 122 because the client will have control over the data that is sent to use for the diagnosis.

Figure 8:
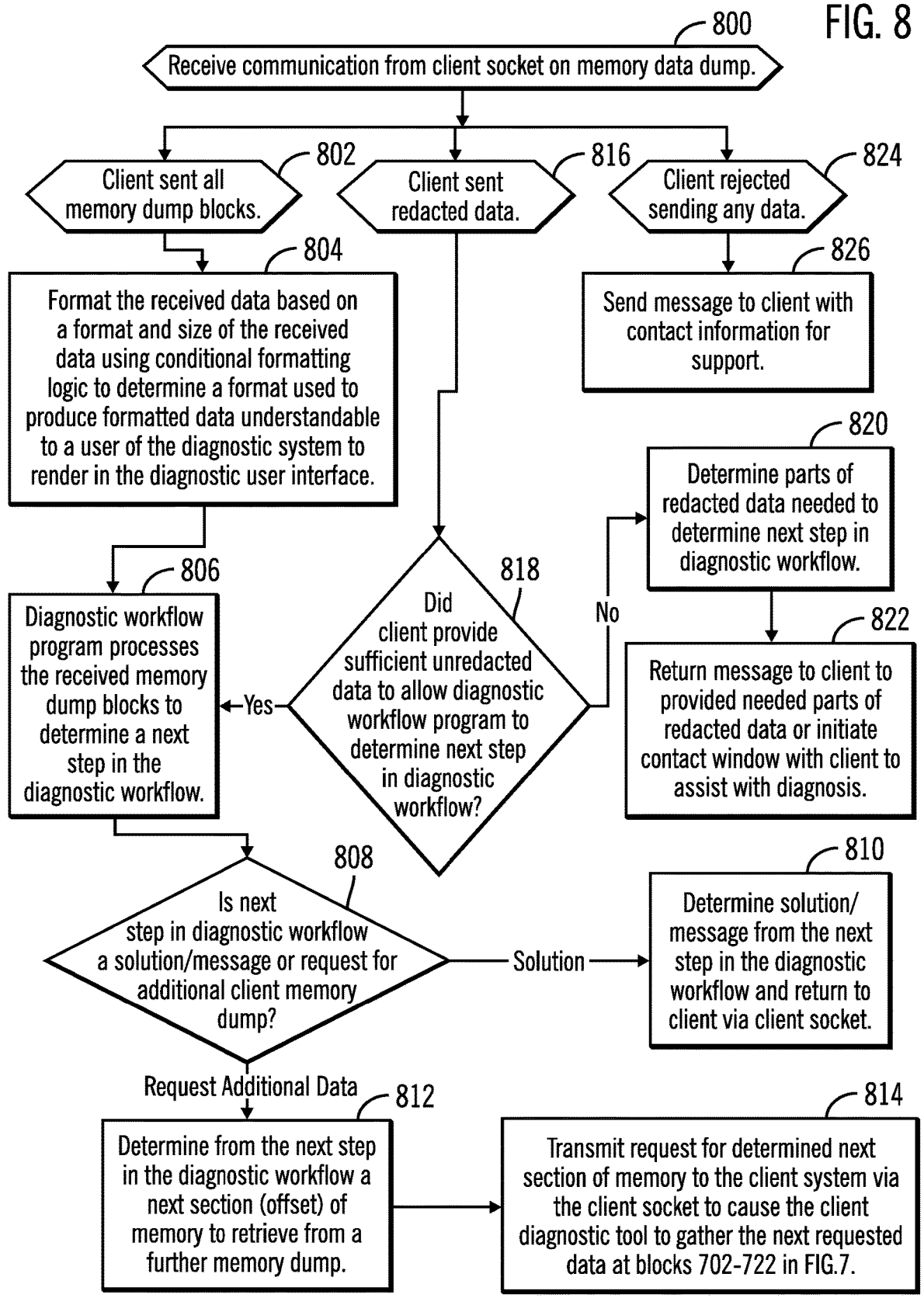
FIG. 8 illustrates an embodiment of operations performed at the diagnostic system to process data transmitted from the client system being diagnosed to render at the diagnostic system and process for diagnosis of the problem at the client system.

FIG. 8 illustrates an embodiment of operations performed by the diagnostic program 110 and diagnostic workflow program 112 for the problem being diagnosed, to process data or a message received from the client diagnostic tool 122 when processing a client user approve, redact or reject command with respect to data displayed in the client user interface 128. The diagnostic program 110 receives (at block 800) a communication from the client socket 120 via the server socket 118. If (at block 802) the client sent all the requested memory dump 130 blocks, such as after selecting the approve button 304 (FIG. 3*a*), then the diagnostic program 110 formats (at block 804) the received data based on a format and size of the received data using conditional formatting logic to determine a format used to produce formatted data understandable to a user of the diagnostic system 100 to render in the diagnostic user interface 114, such as shown in page 310 in FIG. 3*b*. The formatting may provide information to describe the dump data that is useful for debugging and diagnosis by the diagnostic technician operating the diagnostic system 100.

The diagnostic workflow program 112 is invoked to process (at block 806) the received memory dump blocks 130 to determine a next step in the diagnostic workflow according to the conditional logic of the workflow. If (at block 808) the next step in the diagnostic workflow is a solution to the technical problem being diagnosed, then the diagnostic workflow program 112 determines (at block 810) a solution or message from the determined next step in the diagnostic workflow and returns the solution/message to the client system 102 client via the server 118 and client 120 sockets. The solution may comprise a program fix to execute on the client system 102 to fix the problem being diagnosed or instructions of changes to make at the client system 102.

If (at block 808) the determined next step in the diagnostic workflow is a request for additional client data, then the diagnostic workflow program 112 determines (at block 812) from the next step in the diagnostic workflow a next section (offset) of client memory 116 to retrieve from a further memory dump 130. The diagnostic program 110 or diagnostic workflow program 112 may transmit (at block 814) the request for determined next section of memory, such as an address of a range of blocks, to the client system via the client socket 120 to cause the client diagnostic tool 122 to start processing from block 702-722 in FIG. 7 to retrieve the requested next blocks from a memory dump to process in the diagnostic workflow program 112.

If (at block 816) the client sent redacted data, then the diagnostic program 110 determines (at block 818) whether the client system 102 provided sufficient unredacted data to allow the diagnostic workflow program 112 to determine next step in diagnostic workflow. In one embodiment, the diagnostic program 110 may call the diagnostic workflow program 112 to process the unredacted data to determine whether the result of the processing is a next step in the diagnostic workflow or an error. In an alternative embodiment, the diagnostic program 110 may apply rules to determine whether the unredacted data is sufficient to allow for continued processing by the diagnostic workflow program 112. If (at block 818) the unredacted data is sufficient for the diagnostic workflow program 112 to continue, then control proceeds to block 806 to determine the next step or operation in the diagnostic workflow. If (at block 818) the unredacted data is not sufficient or incomplete to continue diagnostic processing, then the diagnostic program 110 determines (at block 820) those parts of the redacted data needed to determine the next step in the diagnostic workflow and returns (at block 822) a message to the client to provide the needed parts of the redacted data or initiate a contact window with the client to provide direct contact with the client user, via phone, email or instant messages, to assist with diagnosis.

If (at block 824) the client sent a message rejecting sending any data, then the diagnostic program 110 may send (at block 826) a message to the client with contact information for in-person support.

With the embodiment of operations of FIG. 8, the diagnostic system may use the data dump returned by the client to continue the diagnostic processing to determine a next step in the diagnostic process. If further data is needed to continue with the diagnostic, then the diagnostic program 110 will send a request for the further needed data, which may require the client system 102 to perform another memory dump to return to the diagnostic system 100. Further, the diagnostic program 110 may determine if sent redacted data is sufficient to continue with the diagnostic workflow processing. In this way, the described embodiments allow the user to control the data sent to the diagnostic system 100 to use to diagnose the client system and at the same time determine whether sent redacted data is sufficient to continue with processing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
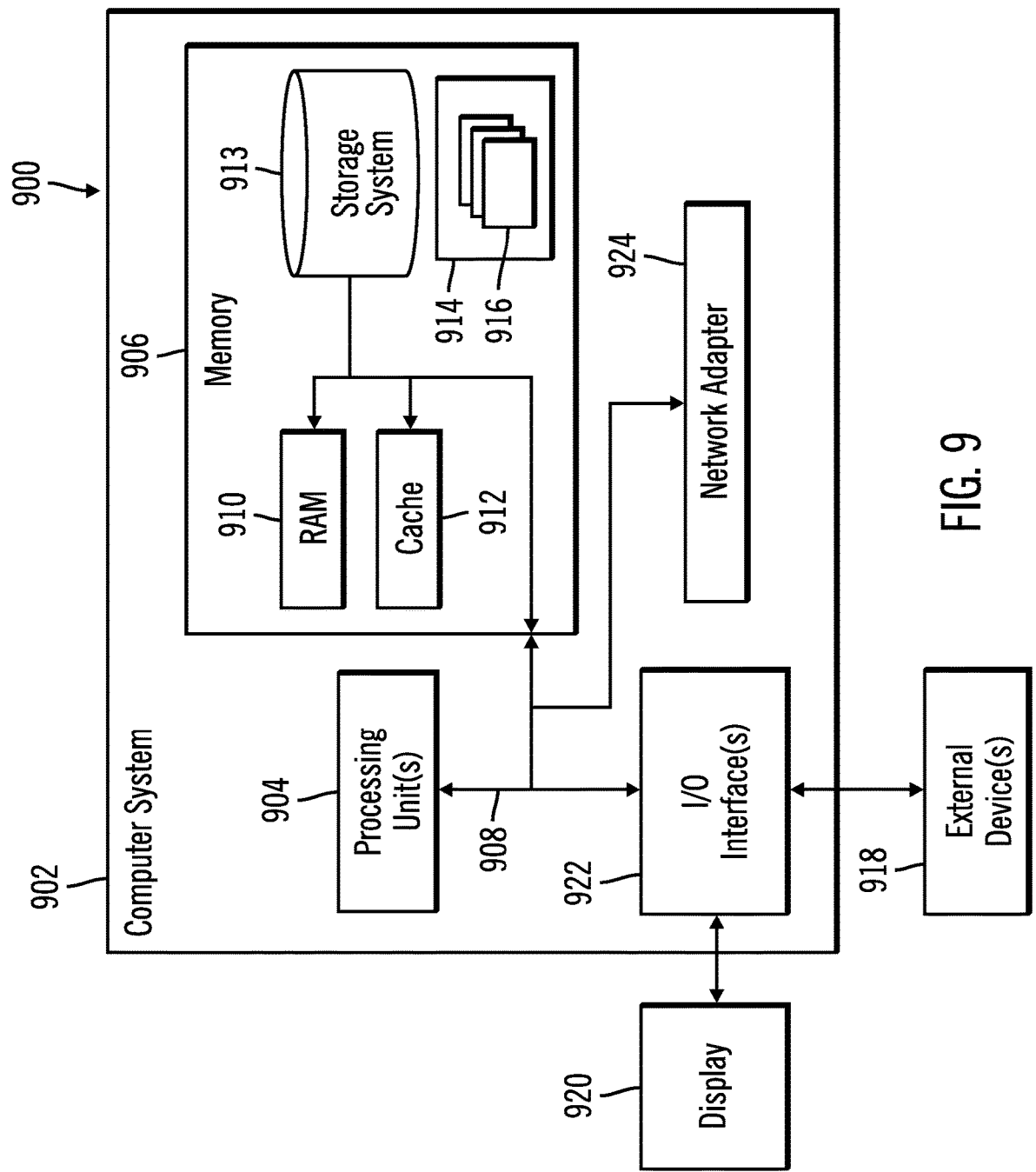
FIG. 9 depicts a computing environment in which the components of FIG. 1 may be implemented.

The computational components of FIG. 1, including the diagnostic system 100 and the client system 102 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing diagnostic services to a client system over a network, wherein the computer program product comprises a computer readable storage medium having computer readable program instructions executed by a diagnostic system to perform operations, the operations comprising:
   transmitting a client program to the client system including a command to retrieve a block of data, wherein the client program is executed to perform operations at the client system comprising:
      retrieving the block of data indicated in the command;
      displaying data in the block of data in a client user interface at the client system; and
      transmitting the data displayed in the client user interface to the diagnostic system in response to user indication to transmit the data displayed in the client user interface;
   receiving, from the client program, data rendered in the client user interface; and
   processing the received data to determine a next operation in a diagnostic workflow program with respect to the client system.

2. The computer program product of claim 1, wherein the command comprises a memory dump command to create a memory dump of blocks of data in a memory of the client system, wherein the block of data to retrieve comprises an offset in the memory dump from which the block of data is extracted, and wherein the block of data to retrieve includes at least one of pointers, control block, counters, understandable words in a language.

3. The computer program product of claim 1, wherein the client program renders in the client user interface a redact graphical control element configured to enable a user of the client system to select portions of the block of data displayed in the client user interface to redact, wherein user selection of the redact graphical control element redacts the selected portions of the block of data from the data transmitted to the diagnostic system.

4. The computer program product of claim 3, wherein the operations further comprise:
   rendering in a diagnostic user interface executed in the diagnostic system the received data from the client program with the selected portions of the block of data redacted as indicated as redacted.

5. The computer program product of claim 3, wherein the operations further comprise:
   determining whether the redacted selected portions of the block of data are needed to continue processing in the diagnostic workflow program;
   determining parts of redacted data needed to determine a next operation in the diagnostic workflow program; and
   notifying at least one of a user at the client system or a diagnostic technician using the diagnostic workflow program of the determined parts of redacted data needed to determine the next operation in the diagnostic workflow program.

6. The computer program product of claim 3, wherein the selected portions of the block of data to redact comprise database data and wherein data returned to the diagnostic system includes an index structure for the diagnostic workflow program to diagnose and repair.

7. The computer program product of claim 3, wherein the client program renders in the client user interface an approve graphical control element that when selected by the user transmits all of the block of data displayed in the client user interface to the diagnostic system and a reject graphical control element to return none of the data rendered in the client user interface and return indication of rejecting returning any of the data rendered in the client user interface.

8. The computer program product of claim 1, wherein the determining the next operation comprises:
   processing the received data to select a conditional processing branch in the diagnostic workflow program, wherein different branches in the diagnostic workflow program requests different blocks of data from the client system to retrieve to use to continue processing in the diagnostic workflow program along a selected branch.

9. The computer program product of claim 1, wherein the operations further comprise:
   processing the received data and a format and size of the received data with conditional formatting logic to determine a format in which to render the received data to be understandable to a user of the diagnostic system;
   formatting the received data with the determined format to produce formatted data; and
   rendering in a diagnostic user interface executed in the diagnostic system the formatted data.

10. A system for providing diagnostic services to a client system over a network, comprising:
   a processor; and
   a computer readable storage medium having computer readable program instructions executed by the processor to perform operations, the operations comprising:
      transmitting a client program to the client system including a command to retrieve a block of data, wherein the client program is executed to perform operations at the client system comprising:
         retrieving the block of data indicated in the command;
         displaying data in the block of data in a client user interface at the client system; and
         transmitting the data displayed in the client user interface to the system in response to user indication to transmit the data displayed in the client user interface;
      receiving, from the client program, data rendered in the client user interface; and
      processing the received data to determine a next operation in a diagnostic workflow program with respect to the client system.

11. The system of claim 10, wherein the client program renders in the client user interface a redact graphical control element configured to enable a user of the client system to select portions of the block of data displayed in the client user interface to redact, wherein user selection of the redact graphical control element redacts the selected portions of the block of data from the data transmitted to the system.

12. The system of claim 11, wherein the operations further comprise:
   rendering in a diagnostic user interface executed in the system the received data from the client program with the selected portions of the block of data redacted as indicated as redacted.

13. The system of claim 11, wherein the operations further comprise:
   determining whether the redacted selected portions of the block of data are needed to continue processing in the diagnostic workflow program;
   determining parts of redacted data needed to determine a next operation in the diagnostic workflow program; and notifying at least one of a user at the client system or a diagnostic technician using the diagnostic workflow program of the determined parts of redacted data needed to determine the next operation in the diagnostic workflow program.

14. The system of claim 10, wherein the determining the next operation comprises:

processing the received data to select a conditional processing branch in the diagnostic workflow program, wherein different branches in the diagnostic workflow program requests different blocks of data from the client system to retrieve to use to continue processing in the diagnostic workflow program along a selected branch.

15. The system of claim 10, wherein the operations further comprise:

processing the received data and a format and size of the received data with conditional formatting logic to determine a format in which to render the received data to be understandable to a user of the system;

formatting the received data with the determined format to produce formatted data; and rendering in a diagnostic user interface executed in the system the formatted data.

16. A method implemented in a diagnostic system for providing diagnostic services to a client system over a network, comprising:

transmitting a client program to the client system including a command to retrieve a block of data, wherein the client program is executed to perform operations at the client system comprising:

retrieving the block of data indicated in the command;

displaying data in the block of data in a client user interface at the client system; and transmitting the data displayed in the client user interface to the diagnostic system in response to user indication to transmit the data displayed in the client user interface;

receiving, from the client program, data rendered in the client user interface; and processing the received data to determine a next operation in a diagnostic workflow program with respect to the client system.

17. The method of claim 16, wherein the client program renders in the client user interface a redact graphical control element configured to enable a user of the client system to select portions of the block of data displayed in the client user interface to redact, wherein user selection of the redact graphical control element redacts the selected portions of the block of data from the data transmitted to the diagnostic system.

18. The method of claim 17, further comprising:

determining whether the redacted selected portions of the block of data are needed to continue processing in the diagnostic workflow program;

determining parts of redacted data needed to determine a next operation in the diagnostic workflow program; and notifying at least one of a user at the client system or a diagnostic technician using the diagnostic workflow program of the determined parts of redacted data needed to determine the next operation in the diagnostic workflow program.

19. The method of claim 16, wherein the determining the next operation comprises:

processing the received data to select a conditional processing branch in the diagnostic workflow program, wherein different branches in the diagnostic workflow program requests different blocks of data from the client system to retrieve to use to continue processing in the diagnostic workflow program along a selected branch.

20. The method of claim 16, further comprising:

processing the received data and a format and size of the received data with conditional formatting logic to determine a format in which to render the received data to be understandable to a user of the diagnostic system;

formatting the received data with the determined format to produce formatted data; and rendering in a diagnostic user interface executed in the diagnostic system the formatted data.

* * * * *

UNITED STATES PATENT AND TRADEMARK OFFICE
CERTIFICATE OF CORRECTION

| | | |
|---|---|---|
| PATENT NO. | : 11,184,463 B1 | Page 1 of 1 |
| APPLICATION NO. | : 17/095731 | |
| DATED | : November 23, 2021 | |
| INVENTOR(S) | : David C. Reed et al. | |

It is certified that error appears in the above-identified patent and that said Letters Patent is hereby corrected as shown below:

On the Title Page

Please correct item (72) of the Inventors to change "Elliot" to "Elliott"

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*